(12) United States Patent
Maeng

(10) Patent No.: US 9,374,433 B2
(45) Date of Patent: Jun. 21, 2016

(54) METHOD AND MOBILE TERMINAL FOR DISPLAYING TERMINAL INFORMATION OF ANOTHER PARTY USING PRESENCE INFORMATION

(75) Inventor: Sun-Young Maeng, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 873 days.

(21) Appl. No.: 12/257,822

(22) Filed: Oct. 24, 2008

(65) Prior Publication Data

US 2009/0117936 A1 May 7, 2009

(30) Foreign Application Priority Data

Nov. 5, 2007 (KR) .................. 10-2007-0112087

(51) Int. Cl.
| | |
|---|---|
| H04M 1/00 | (2006.01) |
| H04L 29/08 | (2006.01) |
| H04M 1/725 | (2006.01) |
| H04M 1/2745 | (2006.01) |

(52) U.S. Cl.
CPC ............ *H04L 67/24* (2013.01); *H04L 67/04* (2013.01); *H04L 67/303* (2013.01); *H04L 67/306* (2013.01); *H04M 1/72547* (2013.01); *H04M 1/2745* (2013.01)

(58) Field of Classification Search
CPC ..................... H04W 88/06; H04M 1/7253
See application file for complete search history.

(56) References Cited

U.S. PATENT DOCUMENTS

| | | | |
|---|---|---|---|
| 7,035,923 B1 | 4/2006 | Yoakum et al. | |
| 8,406,252 B1 * | 3/2013 | Wuthnow et al. | 370/466 |
| 2004/0165714 A1 * | 8/2004 | Pinault | 379/245 |
| 2004/0185885 A1 * | 9/2004 | Kock | 455/466 |
| 2006/0031370 A1 | 2/2006 | Lyle et al. | |
| 2008/0134278 A1 * | 6/2008 | Al-Karmi | 725/141 |
| 2008/0161040 A1 * | 7/2008 | Estevez et al. | 455/553.1 |
| 2008/0192438 A1 * | 8/2008 | Chang | 361/719 |

FOREIGN PATENT DOCUMENTS

| | | |
|---|---|---|
| JP | 03-289255 A | 12/1991 |
| JP | 07-264298 A | 10/1995 |
| JP | 2001-86308 A | 3/2001 |
| JP | 2002-237893 A | 8/2002 |
| JP | 2006-514813 A | 5/2006 |
| JP | 2006-203612 A | 8/2006 |
| JP | 2007-280416 A | 10/2007 |
| JP | 2007-282130 A | 10/2007 |
| WO | 2004/071048 A1 | 8/2004 |

* cited by examiner

*Primary Examiner* — Sibin Chen
(74) *Attorney, Agent, or Firm* — Jefferson IP Law, LLP

(57) ABSTRACT

When a user terminal makes contact with another party using a phone call, a video communication, a short message service, a multimedia message service, an instant message service, or an e-mail, functions supported by the other party's terminal are displayed on the user terminal using presence information. When a type of preferred contact is detected, a menu based on the detected preferred contact type is provided. In the user terminal, a transceiver receives the presence information and a controller displays the menu listing the functions supported by the other party's terminal in a desired method using the presence information. The controller extracts information about the detected preferred contact type set by the other party's terminal from the received presence information and displays the menu in a desired method based on the extracted information.

20 Claims, 10 Drawing Sheets

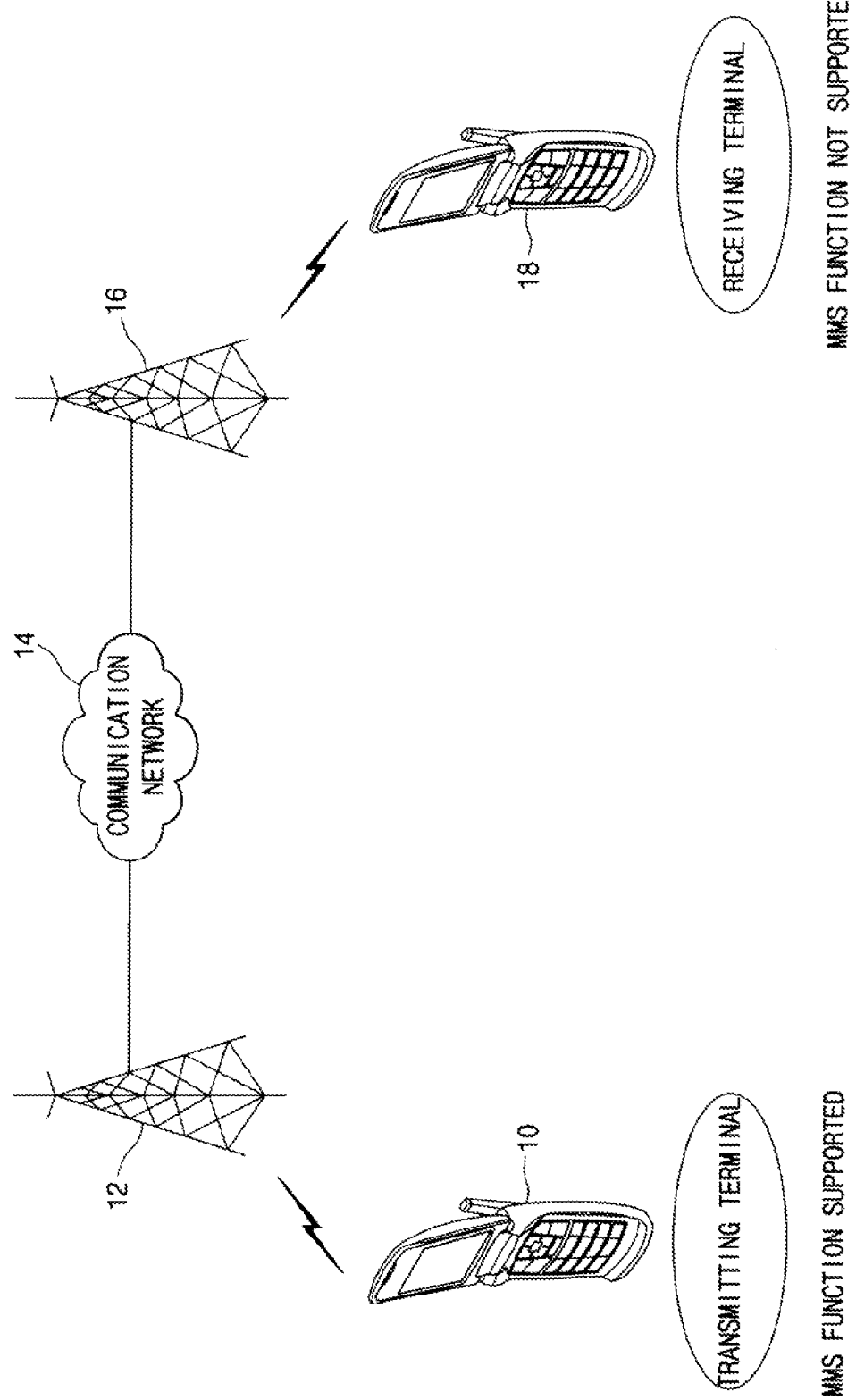

METHOD AND MOBILE TERMINAL FOR DISPLAYING TERMINAL INFORMATION OF ANOTHER PARTY USING PRESENCE INFORMATION

PRIORITY

This application claims the benefit under 35 U.S.C. §119(a) of a Korean patent application filed with the Korean Industrial Property Office on Nov. 5, 2007 and assigned Serial No. 2007-112087 the entire disclosure of which is hereby incorporated by reference.

BACKGROUND OF THE INVENTION

1. Field of the Invention

The present invention relates to a mobile terminal. More particularly, the present invention relates to a mobile terminal for displaying a menu according to a function supported by another party's terminal or a terminal status set by the other party.

2. Description of the Related Art

With advances in mobile communication technology, wireless communication systems are able to provide various types of services that are capable of transmitting multimedia data at high transmission speed. For example, wireless communication systems are able to transmit such items as e-mail, photos, videos and music at high speed.

Commensurate with the development of the mobile communication services, mobile terminal manufacturers are producing terminals that are capable of supporting the various multimedia services. However, new functions may be only supported by models that are produced after the technical development. Accordingly, previously produced models may not support the new functions.

A new model terminal may support a larger number of functions than an old model terminal. Accordingly, when a user purchases a new model terminal and uses a new function supported by the new model, an older model terminal, being used by another party that is communicating with the user, may not support the selected function. In practice, however, it is difficult for the user to know all functions supported by the terminal of the other party. An example of this problem will be described below.

FIG. 1 is a schematic diagram illustrating an example of a conventional Multimedia Message Service (MMS) transmission.

As illustrated in FIG. 1, a transmitting terminal 10 is a new model terminal capable of supporting an MMS function and a receiving terminal 18 is an old model terminal incapable of supporting the MMS function.

When a user of the transmitting terminal 10, after selecting 'Compose MMS' from a menu list, composes and transmits an MMS message to which an image is attached, the composed MMS message is provided to the receiving terminal 18 through a base station 12 at a transmitting side, a communication network 14, and a base station 16 at a receiving side in a normal procedure.

However, since the receiving terminal 18 does not support the MMS function, the MMS message from the transmitting terminal 10 may not be provided to the receiving terminal 18, the attached image may not be displayed on a screen of the receiving terminal 18, or damaged content of the MMS message may be displayed on the screen of the receiving terminal 18.

Even when a message indicating that the MMS message transmission has failed is displayed on the screen of the transmitting terminal 10 to address the above problem, further annoyances, such as the trouble taken to create the MMS message, the service fee to transmit the MMS message, or the trouble taken to re-create and re-transmit the MMS message according to an MMS message transmission failure may be additionally imposed.

This problem creates even greater user inconvenience and annoyance when an MMS message having a large volume of data, such as multimedia content or e-mail that is time-consuming to create and transmit, fails to be properly transmitted since a corresponding function is not supported by a terminal of the other party.

Another problem in the conventional system is that the other user may not be aware of the status of the terminal user. For example, since the other party may not be aware of a situation in which it is difficult for the terminal user to perform voice communication because, for example, the user is in a meeting or is asleep, there is no method for preventing an incoming call from the other party. In the conventional technology, the user may notify the other party that a conversation by phone is impossible by pressing an automatic answering button when an incoming call is received from the other party. When desiring to request the other party to send a text message since the conversation by phone is impossible while in a meeting, the user bears the additional burden of recording an automatic answering message indicating a situation such as the above every time.

SUMMARY OF THE INVENTION

An aspect of the present invention is to address at least the above-mentioned problems and/or disadvantages and to provide at least the advantages described below. Accordingly, an aspect of the present invention is to provide a terminal that can communicate with another party according to a function supported by a terminal of the other party by displaying a menu of functions supported by the terminal of the other party in a desired method using presence information. Another aspect of the present invention is to provide a mobile terminal that can detect a type of preferred contact set by another party from presence information and provide a menu for making contact with the other party according to the detected preferred contact type, thereby improving the user convenience.

In accordance with an aspect of the present invention, a mobile terminal is provided. The mobile terminal includes a transceiver for receiving presence information including information about functions supported by other terminals and a controller for detecting functions supported by a terminal of another party using the received presence information and for determining a menu to be displayed in a desired method based on the detected functions.

In an exemplary implementation, an item of the menu to be displayed may be at least one of a phone call, a video communication, a short message service, a multimedia message service, an instant message service, and an e-mail.

In another exemplary implementation, the desired method may include at least one of displaying only the functions supported by the terminal of the other party, deactivating and displaying a function unsupported by the terminal of the other party, and displaying a pop-up window for a notification of the unsupported function.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 1 is a schematic diagram illustrating a conventional MMS transmission;

Throughout the drawings, it should be noted that like reference numbers are used to depict the same or similar elements, features and structures.

DETAILED DESCRIPTION OF EXEMPLARY EMBODIMENTS

Figure 2A:
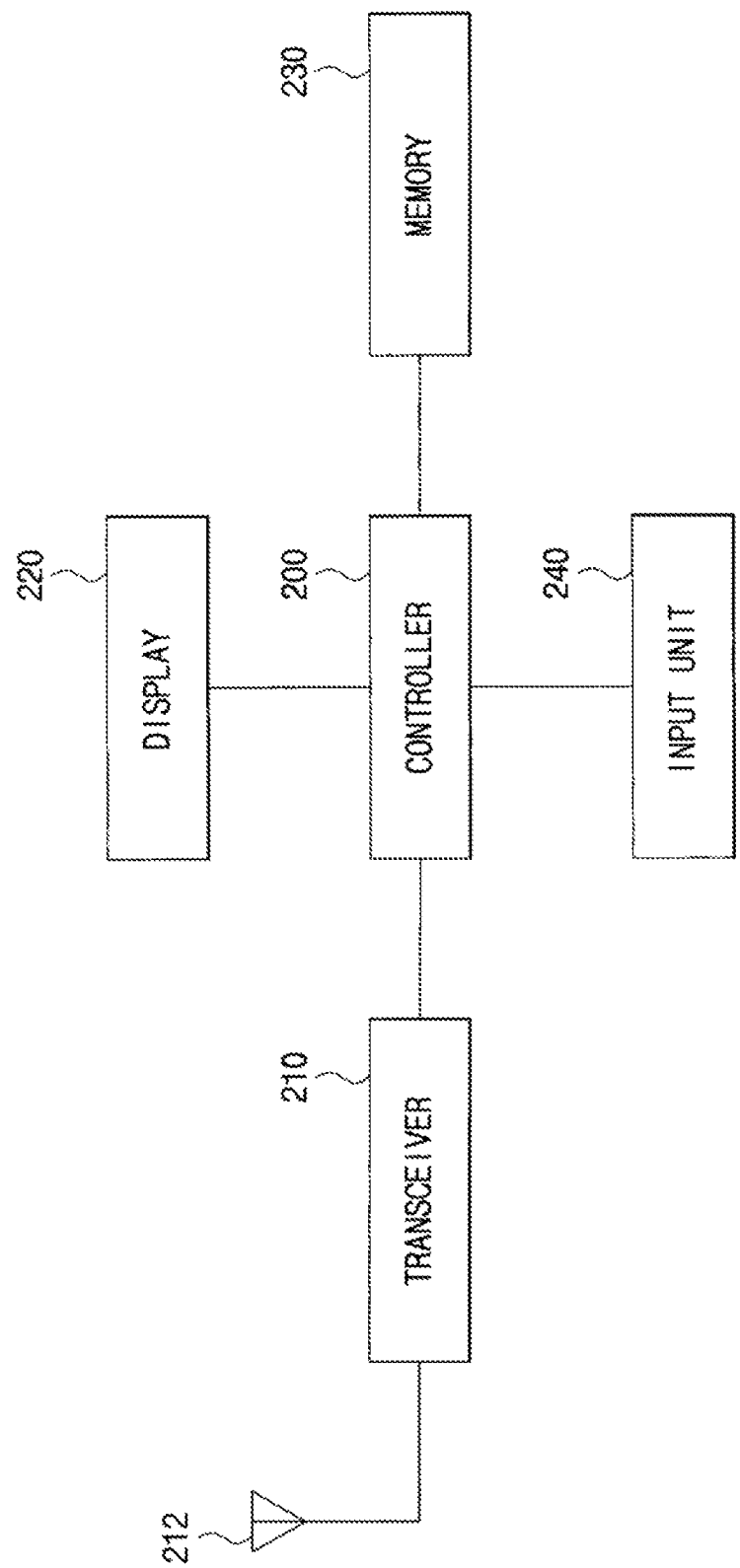
FIG. 2A is a schematic block diagram of a mobile terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Presence information is an importable element for an Instant Messaging and Presence Service (IMPS) technology, and may be defined by the availability of a client device or terminal (for example, phone is on, off, or busy), a user status (for example, available, unavailable, or in a meeting), location information, functions supported by a client terminal (for example, voice, text, General Packet Radio Services (GPRS), multimedia), user mood (for example, happy, angry, sad), user hobbies (for example, football, fishing, dancing) and the like. The user status item, the user mood item, and the user hobby item are variable items that can be set and changed by the user. The variable items are reflected in the presence information.

The presence information is published according to parameters or detailed specifications defined in an Open Mobile Alliance (OMA) standard. Based on the OMA standard, service providers provide communication services and manufacturers produce terminals.

In particular, the presence information is usually used in instant messenger services such as the MSN messenger of Microsoft, the AOL Instant Messenger (AIM) of AOL, the NateOn messenger of SK Communications, among others. A connection status of a client using the messenger may be set to Online, Offline, Away, and the like. Furthermore, according to settings input by the user, an icon that indicates the client mood (happy, angry, sad) may also be displayed. Client hobby information may also be set for display and viewing by other clients.

In the instant messenger, the presence information is typically used to indicate a status (Away, Mood, Hobby, or the like) set by the client and also includes device information of the client terminal joining a mobile communication service.

Table 1 shows client information.

TABLE 1

| Client Information | | | |
|---|---|---|---|
| ClientInfo | Req | Single/Multiple | Description |
| ClientContentLimit | M | S | Describes the content limitations of the publisher's client and the entire route of servers towards the publisher's client. Originates from the Service Access Point based on client capability negotiation - see [CSP]. Each of the servers - that filter the IMs based on content type - where this presence attribute passes though MUST verify the included limitations against their own limitation settings and update this attribute on the way to the consumer by removing the non-supported content type(s) and decreasing the limitation(s) if necessary - ultimately resulting in a presence attribute on the consumer side that indicates all content types and limitations that are supported by the publisher and via the entire server route to the publisher. The pass-thru servers MAY offer transcoding of various content types - these pass thru servers are NOT REQUIRED to update the ClientContentLimit presence attribute, but MUST transcode the content of the instant messages as they pass through. The originator server MUST maintain this attribute throughout the whole session, and it SHOULD maintain it for an undefined period of time after the session is terminated in order to avoid revealing the OnlineStatus of the client via this presence attribute. |

TABLE 1-continued

Client Information

| ClientInfo | Req | Single/Multiple | Description |
|---|---|---|---|
| ClientType | O | S | Describes the device type, if PC, Mobile, HTML etc. Originates from the Client Application. |
| DevManufacturer | O | S | Name of the device manufacturer. Originates from the Client Application. |
| ClientProducer | O | S | Name of the producer of the client. Originates from the Client Application. |
| Model | O | S | Model of the device. Originates from the Client Application. |
| ClientVersion | O | S | Version of the client. Originates from the Client Application. |
| Language | O | S | Language setting of the client device. Originates from the Client Application. |
| ClientIMPriority | O | S | IM priority of the client. Originates from the Service Access Point based on client capability negotiation - see SessionPriority in [CSP] |
| Application-ID | O | S | The Application-ID that the client used during login. |

As shown in Table 1, the presence information includes DevManufacturer information, Model information, ClientVersion information, and so on. When the presence information of another party is received, information of a manufacturer, model, and version of a terminal of the other party can be extracted. Recently produced terminals support "OMA Version 1.3" functions and the number of products based on a presence standard proposed by the OMA is increasing.

Elements or parameters included in the client information include a client type indicating a type of device used by the client. The client type defined in the presence standard is shown in the following Table 2.

TABLE 2

Client type

| Information element | Client Type |
|---|---|
| Data type | An enumerated String |
| Format | One of the following values:<br>MOBILE_PHONE - a mobile phone<br>COMPUTER - a computer<br>PDA - a handheld computer<br>CLI - Command Line Interface<br>OTHER |
| Description | Type of the device |
| Range | MOBILE_PHONE \|COMPUTER \|PDA\|CLI \|OTHER |

The presence information also includes types of communication supported by the client (for example, a phone client, an SMS client, an MMS client) as shown in the following Table 3.

TABLE 3

Communication Capabilities

| Information element | Cap |
|---|---|
| Data type | An enumerated String |
| Format | CALL - a phone client<br>SMS - an SMS client<br>MMS - an MMS client<br>IM - an IM client<br>EMAIL - an e-mail client |
| Description | The communication clients represented with a predefined value. |
| Range | CALL \| SMS \| MMS \| IM \| EMAIL |

Herein, SMS refers to a short message service, MMS refers to a multimedia message service, and IM refers to an instant message service. In the presence specification published by the OMA in October 2005, video communication related to CALL was not included. However, since the video communication service has been commercialized, it is expected that the video communication will be included in a new version of presence specification to be published by the OMA.

FIG. 2A is a schematic block diagram of a mobile terminal according to an exemplary embodiment of the present invention.

As illustrated in FIG. 2A, the mobile terminal includes a controller 200, a transceiver 210, a display 220, a memory 230, and an input unit 240. In FIG. 2A, it is to be understood that only essential elements for an operation of the mobile terminal are illustrated and that other elements (not illustrated) can be added.

The transceiver 210 performs a function for receiving presence information regarding a terminal of another party or transmitting its own presence information. As illustrated in FIG. 2A, the transceiver 210 can be connected to an antenna 212.

The input unit 240 performs a function for receiving an input of a terminal user, and can include any of a keypad, a touch screen, and the like.

The memory 230 performs a function for storing the presence information received through the transceiver 210. In an exemplary implementation, the terminal may be manufactured to include information regarding functions supported by previously produced terminals (including models of other companies) in the memory 230. By having this information provided to the terminal during its manufacture, the number of times of receiving presence information through the transceiver 210 whenever an attempt to communicate with the other party is made can be reduced.

The controller 200 performs a processing operation for displaying a list of functions supported by the terminal of another party at a receiving side to a user terminal. The controller 200 may also perform a processing operation for detecting, from presence information, a type of preferred contact set by the other party and displaying a menu based on the detected preferred contact type.

More specifically, the controller 200 acquires a basic menu list embedded in the terminal, for example a menu list stored in memory 230. The basic menu list can differ according to terminal manufacturers or models. The controller 200 acquires the presence information of the terminal of the other party and detects a function supported by the terminal of the other party or a set preferred contact type from the presence information. Major parameters retrieved from the presence information in the controller 200 are as follows.

In terms of communication capabilities, a network communication-related function supported by a receiver terminal can be detected using Cap values.

In terms of ClientInfo, a model of the receiver terminal can be detected by acquiring information of DevManufacturer, Model, and ClientVersion.

In terms of PreferredContacts, a type of preferred contact with a receiver can be detected using PrefC values.

Values of Communication capabilities, ClientInfo, DevManufacturer, Model, ClientVersion, Cap, PreferredContacts, PrefC, and the like are parameters defined in the presence specification as shown in Tables 1 to 3.

When the function supported by the terminal of the other party or the set type of preferred contact is detected from the presence information, the controller 200 controls the display 220 to display an item of the function supported by the terminal of the other party or an item of the preferred contact type set by the other party in the basic menu list embedded in the terminal according to a desired method.

Referring to ClientInfo included in the presence information, the information of DevManufacturer, Model, ClientVersion, and the like can be acquired, such that a menu can be displayed based on functions supported by the terminal of the other party.

When the other party's terminal supports a specific function but the user terminal does not support that function, the function does not need to be specially considered since the function is not included in the basic menu list.

Figure 2B:
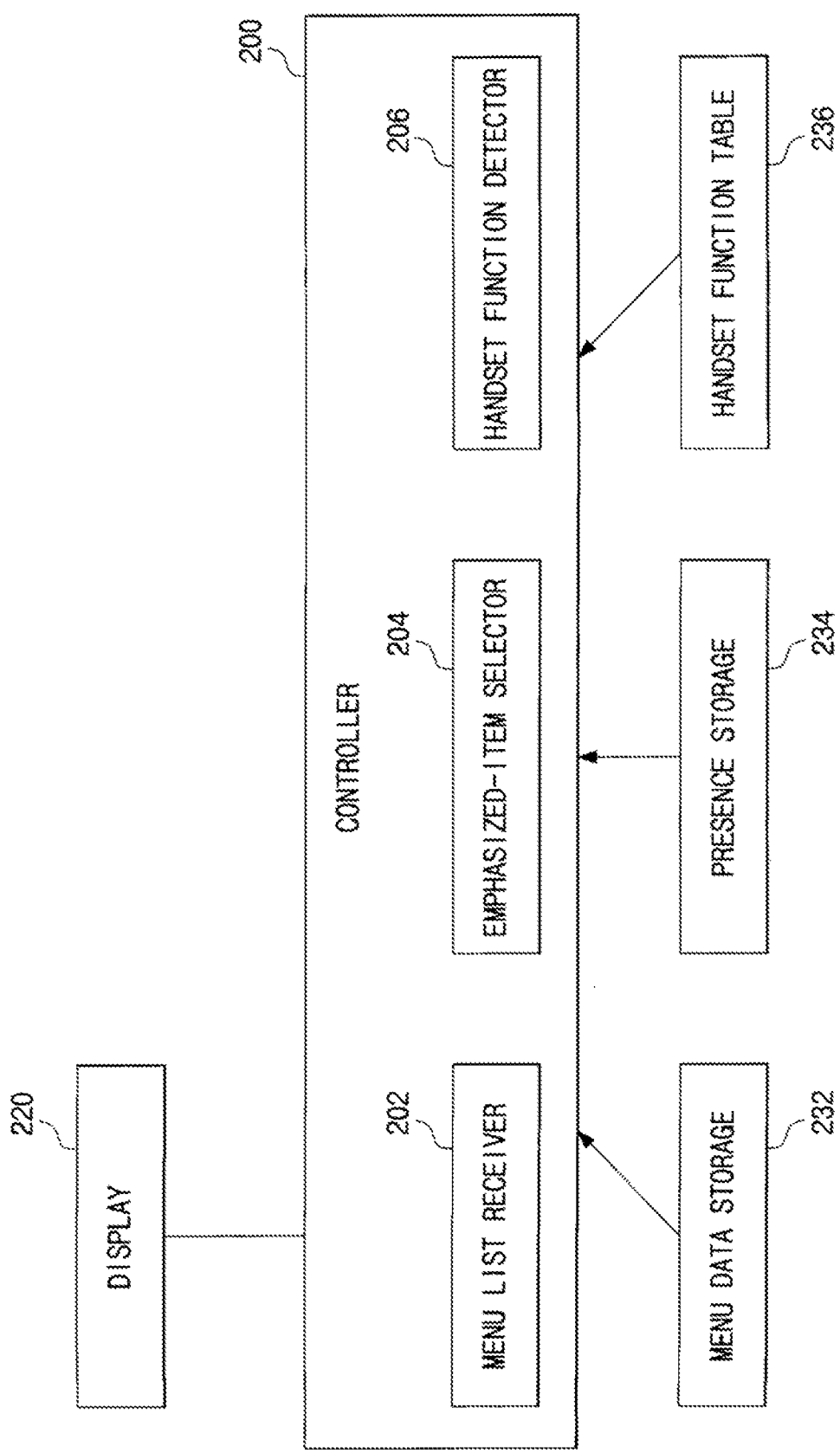
FIG. 2B is a schematic block diagram of an exemplary controller of FIG. 2A.

FIG. 2B is a schematic block diagram of an exemplary controller of FIG. 2A.

As illustrated in FIG. 2B, the controller 200 according to an exemplary embodiment of the present invention includes a menu list receiver 202, an emphasized-item selector 204, and a handset function detector 206.

A menu data storage 232 stores data about a menu supported by the terminal, and the menu list receiver 202 acquires menu information to be displayed from the menu data storage 232. Since a supported function and embedded software differ according to terminals, data stored in the menu data storage 232 can be different based on the model or type of terminal. Moreover, the data stored in the menu data storage 232 can be changed over time, for example if the terminal is updated.

The handset function detector 206 detects functions supported by terminal models from a handset function table 236. The handset function table 236 includes attribute values including DevManufacturer, Model, ClientVersion, a supported menu and the like.

Initial values of the handset function table 236 can include attribute values of other terminal models provided upon terminal fabrication. Attribute values based on terminal models released after the terminal fabrication can be received from the presence information and can be updated.

A presence storage 234 provides information based on parameters or attributes defined in the OMA presence information. In order to identify presence information mapped to a phone number of a terminal of a specific other party stored in the user terminal, a client address CAddr for preferred contact included in the presence information received from the other party's terminal is first retrieved. When the client address is absent, matched presence information is read by retrieving contact information from items of communication capabilities.

When the menu list is displayed on the display 220 of the terminal, the emphasized-item selector 204 determines an item related to a function supported by the other party's terminal detected from the presence information or determines an item related to a type of preferred contact set by the other party.

The menu data storage 232, the presence storage 234, and the handset function table 236 can be configured in the memory 230 or the controller 200.

Figure 3A:
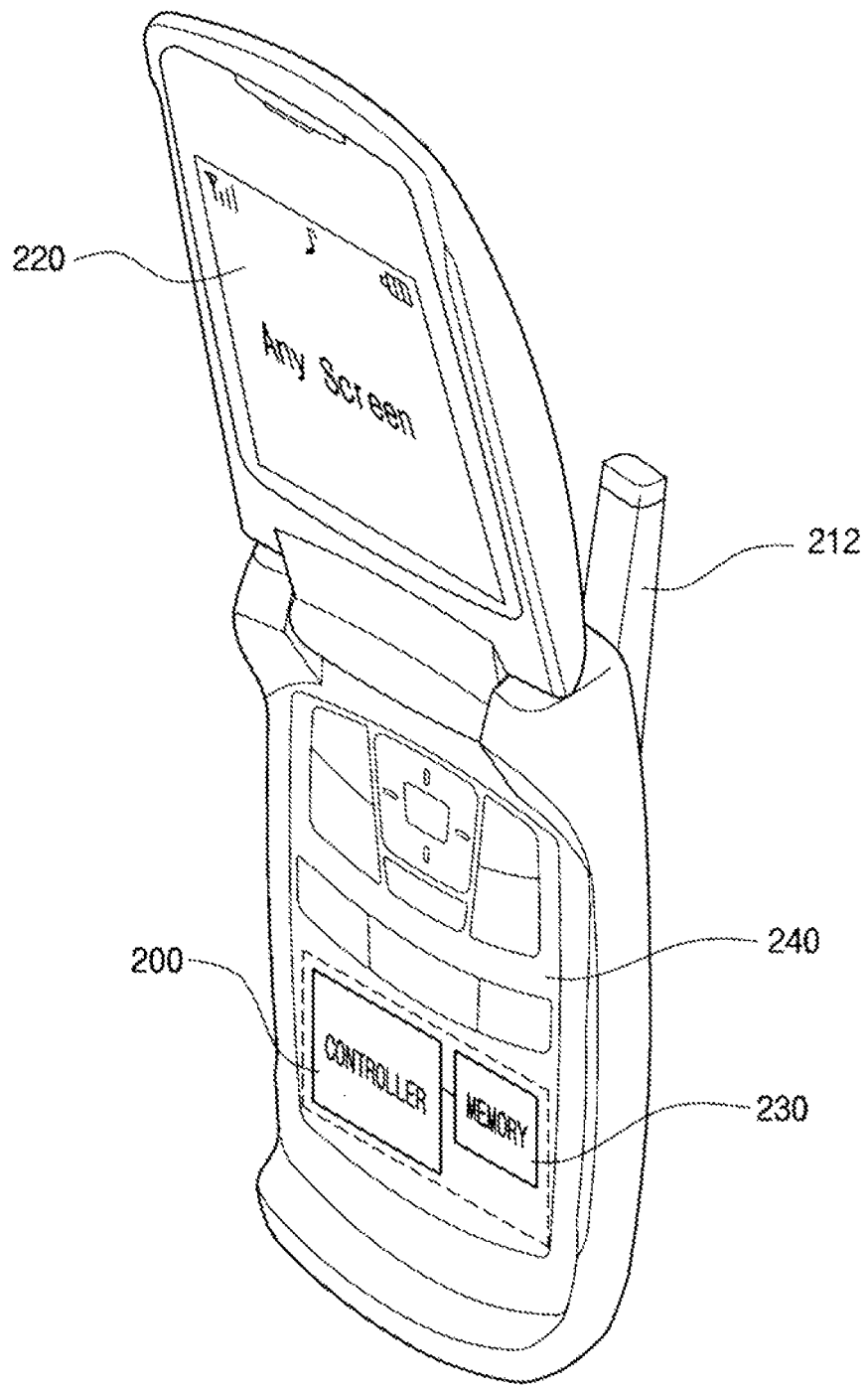
FIGS. 3A and 3B are perspective views of mobile terminals according to exemplary embodiments of the present invention.
Figure 3B:
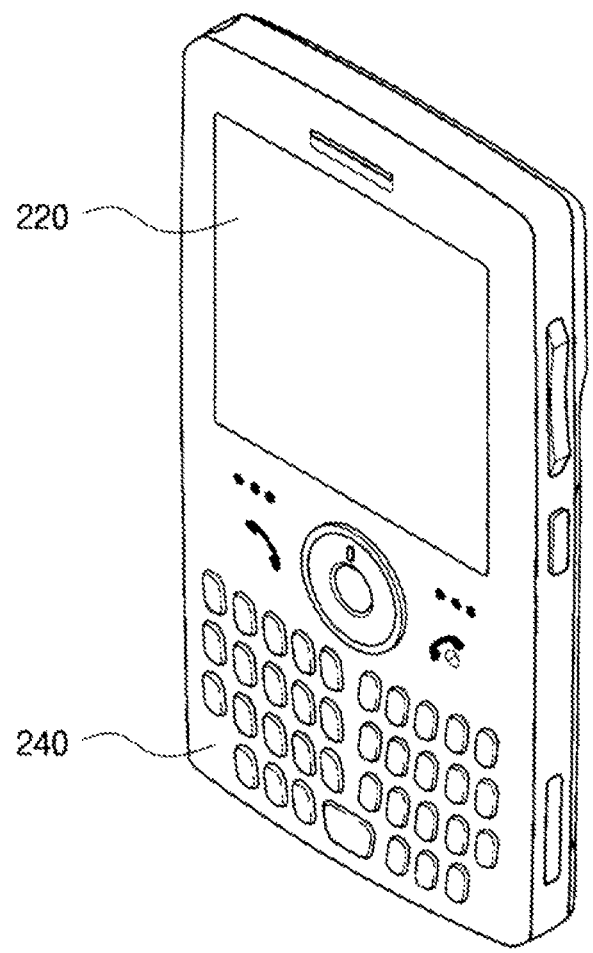

FIGS. 3A and 3B are perspective views of mobile terminals according to exemplary embodiments of the present invention.

FIG. 3A illustrates an example of a folder type mobile terminal and FIG. 3B illustrates an example of a Personal Digital Assistant (PDA) or smart phone. The terminals illustrated in FIGS. 3A and 3B include the elements previously discussed with reference to FIGS. 2A and 2B. For example, the terminals illustrated in FIGS. 3A and 3B include a controller 200, a transceiver 210 and associated antenna 212, a display 220, a memory unit 230 and an input unit 240, although not all elements are illustrated in these figures. Because these elements were previously described, they will not be described again for sake of conciseness.

Figure 4:
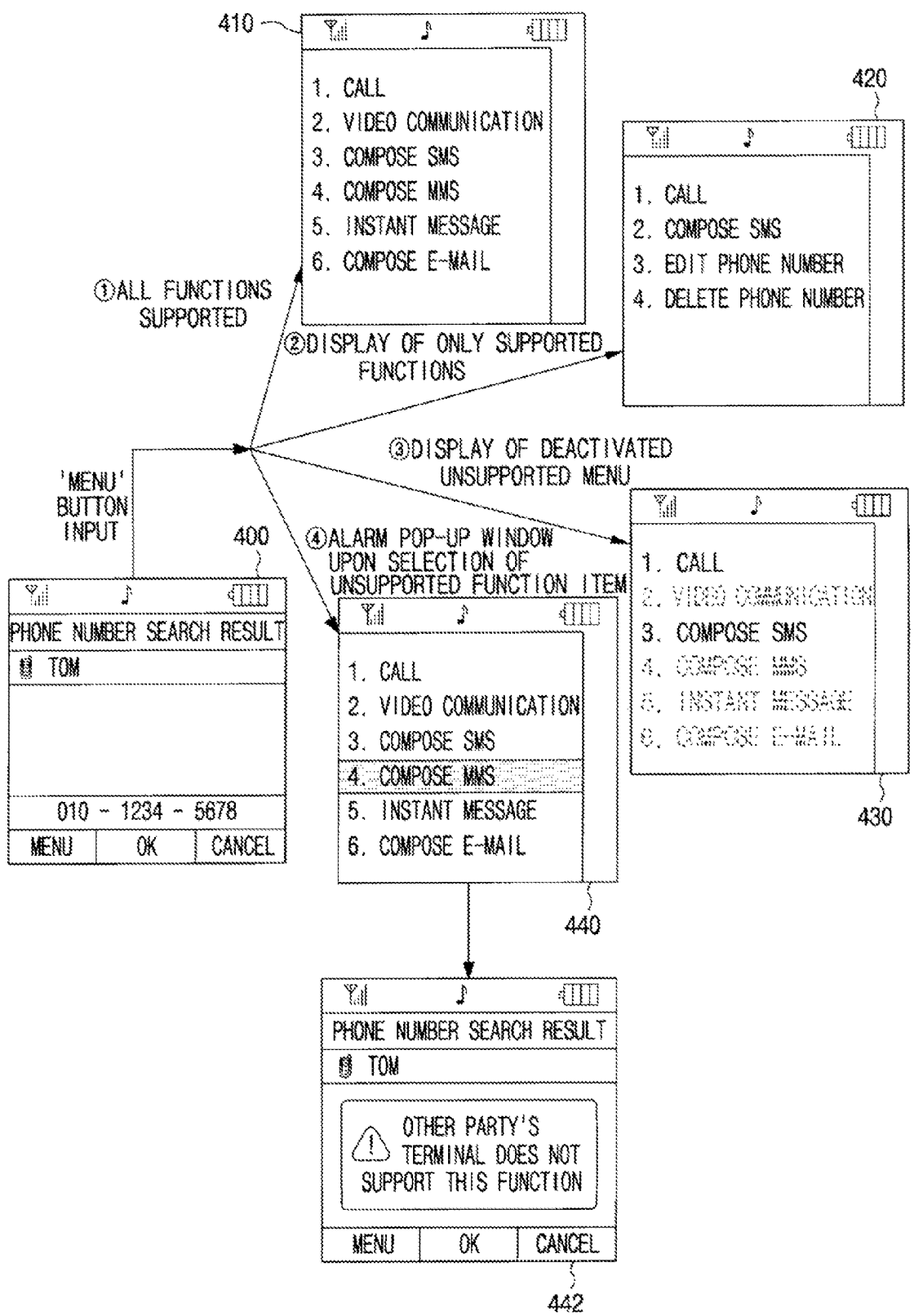
FIG. 4 illustrates a menu display method according to an exemplary embodiment of the present invention.

FIG. 4 illustrates various screen images that are displayed when executing a menu display method according to an exemplary embodiment of the present invention.

It is assumed that the user intends to make a call or transmit a message to another party called 'Tom.' To retrieve a phone number for 'Tom', the user executes a phone number search function embedded into the user terminal. Upon execution of the search function, the phone number 010-1234-5678 of the other party (Tom) is displayed on the display 220 as indicated by reference numeral 400.

When the user inputs a menu button, selection items such as Call, Video Communication, Compose SMS, Compose MMS, Instant Message, Compose E-mail, are displayed. When the selection items are displayed, the controller 200 detects functions supported by the terminal of the other party (for example, 'Tom') from the presence information and displays the detected functions using a desired method.

More specifically, various methods are possible for detecting the functions supported by the other party's terminal from the presence information when the user presses the menu button after retrieving the phone number of the other party. In a first method, the functions supported by the other party can be detected by receiving the presence information of the other party via a communication network. In another method, the functions supported by the other party can be detected by periodically receiving and reflecting presence information mapped to phone numbers registered in the terminal. In still another method, the functions supported by the other party can be detected by retrieving stored information when the user searches for information on the other party in a state in which read information is stored whenever information about the function supported by the other party's terminal is read.

Furthermore, to display the functions supported by the other party's terminal on the display 220, various embodiments are possible. For example, all functions can be activated and displayed when all the functions displayed on the menu of the user terminal are supported by the other party's terminal, as indicated by reference numeral 410. In another example, only functions supported by the other party's terminal can be displayed as indicated by reference numeral 420. In still another example, functions unsupported by the other party's terminal can be deactivated and displayed in incised, small, or faint characters or letters or low-brightness colors as indicated by reference numeral 430. In another example, a basic menu of the user terminal can be displayed as indicated by reference numeral 440 and a pop-up window containing an alarm message can be displayed when the user selects a function unsupported by the other party's terminal as indicated by reference numeral 442.

In FIG. 4, the items of Call, Video Communication, Compose SMS, Compose MMS, Instant Message, and Compose E-mail that are displayed when the user presses the menu button are only exemplary and are not intended to be limiting. Furthermore, the above-described methods for displaying the functions of the other party's terminal are only exemplary. Those of ordinary skill in the art can apply various modifications according to situations or according to specific functions or effects as desired by the user.

Figure 5:
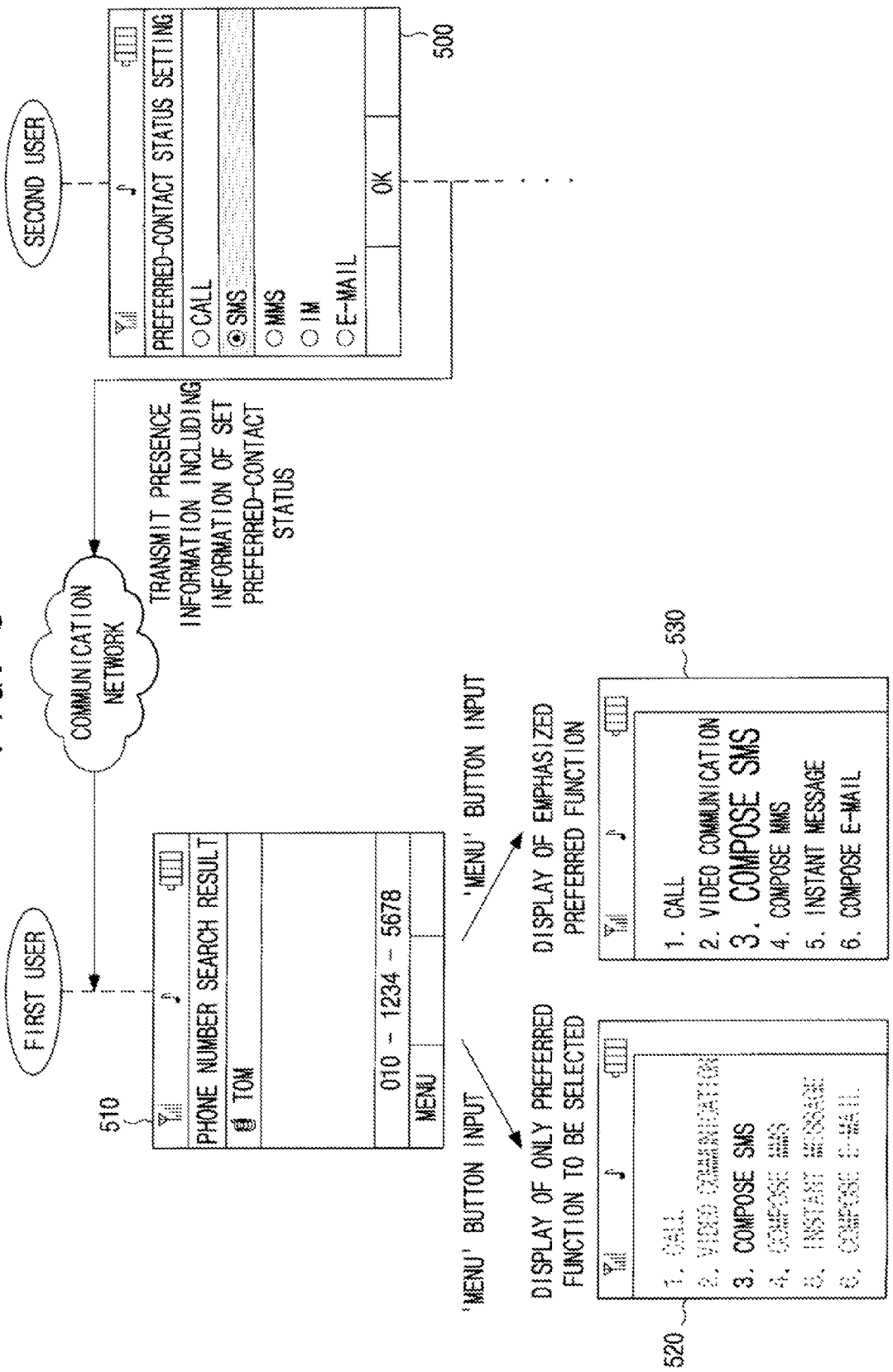
FIG. 5 illustrates an example of displaying a menu based on types of preferred contact according to an exemplary embodiment of the present invention.

FIG. 5 illustrates an example of displaying a menu based on a preferred contact type according to an exemplary embodiment of the present invention.

According to an exemplary embodiment of the present invention, when the terminal user attempts execution of a call, message, or e-mail transmission to a specific other party, a method for displaying a smart menu based on a preferred contact type set by the other party may be provided using the presence information.

The presence information includes information about a preferred contact type set by the user. Preferred contacts published in OMA version 1.3 are shown in the following Table 4.

TABLE 4

| Preferred Contacts | |
|---|---|
| Information element | PrefC |
| Data type | An enumerated String |
| Format | CALL - the publisher prefers to be called |
| | SMS - the publisher prefers to get an SMS |
| | MMS - the publisher prefers to get an MMS |
| | IM - the publisher prefers to get an IM |
| | EMAIL - the publisher prefers to get EMAIL |
| Description | The user preference |
| Range | CALL | SMS | MMS | IM | EMAIL |

Accordingly, preferred contact types included in the presence information can be detected. When a menu reflecting a preferred contact type set by the other party is displayed on the terminal, the terminal user can select the preferred contact type desired by the other party.

FIG. 5 illustrates an exemplary embodiment of a menu display method when the preferred contact type is set to SMS. As illustrated in FIG. 5, Call, SMS, MMS, IM, and E-mail are displayed as the preferred contact types on the display 220 under control of the controller 200. When a second user sets the preferred contact status to SMS through a second user terminal as indicated by reference numeral 500, presence information containing setting information is transmitted via a communication network.

The transmitted presence information is received through the transceiver 210 of a first user terminal and is stored in the memory 230 in correspondence with information of the second user (for example, 'Tom' in FIG. 5). To make contact with the second user, the first user retrieves a phone number of the second user (for example, 'Tom') as indicated by reference numeral 510 and selects 'Tom' as a receiver. When the menu button is pressed, the controller 200 displays a menu in which a specific item is emphasized by referring to the presence information of the second user (for example, 'Tom') stored in the memory 230.

In FIG. 5, the controller 200 of the first user terminal controls the display 220 to display a menu in which an item of 'Compose SMS' is emphasized since a preferred contact status set by the second user is SMS and corresponding information is included in the presence information received by the first user terminal.

To emphasize and display an item, various methods are possible. In a first method, the emphasized item can be the only one activated from among other items. In another method, the emphasized item can be displayed in bold letters, in a different letter color or in a different letter size. Furthermore, the emphasized item can be shaded or displayed in a background color, or the emphasized item can flicker or be displayed in italic letters. In the example of FIG. 5, the emphasized item is activated as indicated by reference numeral 520 or is displayed in a large size as indicated by reference numeral 530.

In relation to an operation in which the controller 200 detects a preferred contact status set by the second user from the presence information, various methods are possible. For example, the controller 200 may detect the preferred contact status by receiving and reading the presence information of the second user through a mobile communication network when the first user retrieves a phone number of the second user and then presses the menu button. In another example, the controller 200 may detect the preferred contact status from reflected presence information by reflecting the presence information mapped to phone numbers registered in the first user terminal. In still another example, the controller 200 may detect the preferred contact status of a specific other party from presence information when the first user retrieves a phone number of the specific other party in a state in which changed presence information is stored in the memory 230 whenever preferred contact types of other parties of phone numbers registered in the first user terminal are changed.

Figure 6:
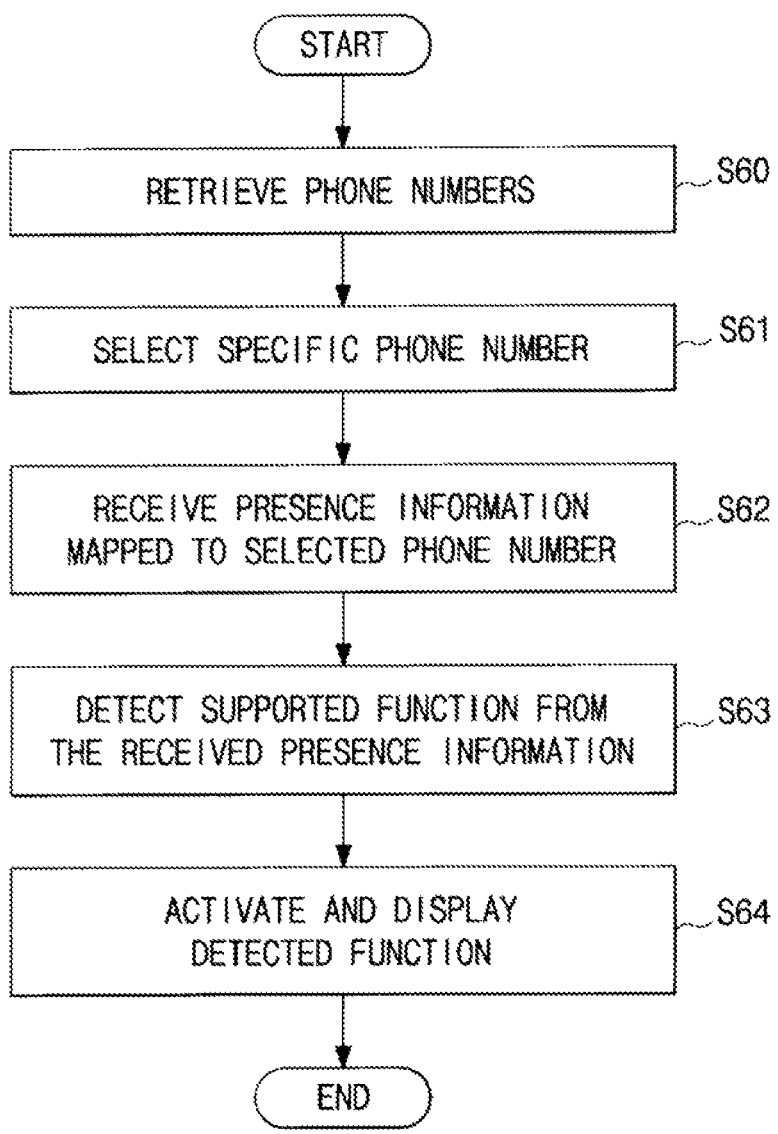
FIG. 6 is a flowchart illustrating a method for displaying a supported function according to an exemplary embodiment of the present invention.

FIG. 6 is a flowchart illustrating a method for displaying a supported function according to an exemplary embodiment of the present invention.

A terminal user retrieves a stored specific phone number to make contact with a specific other party thereof in step S60 and selects the specific phone number in step S61. When the specific phone number is selected in step S61, the controller 200 receives presence information of a terminal mapped to the selected phone number in step S62. With regard to step S62, because several exemplary ways in which the controller 200 may receive the presence information of the terminal mapped to the selected phone number have been explained above, they will not be restated here for conciseness. The controller 200 detects functions supported by the other party's terminal in step S63 and displays the supported functions in a desired method in step S64. The desired method has been described above with reference to FIG. 4.

Figure 7:
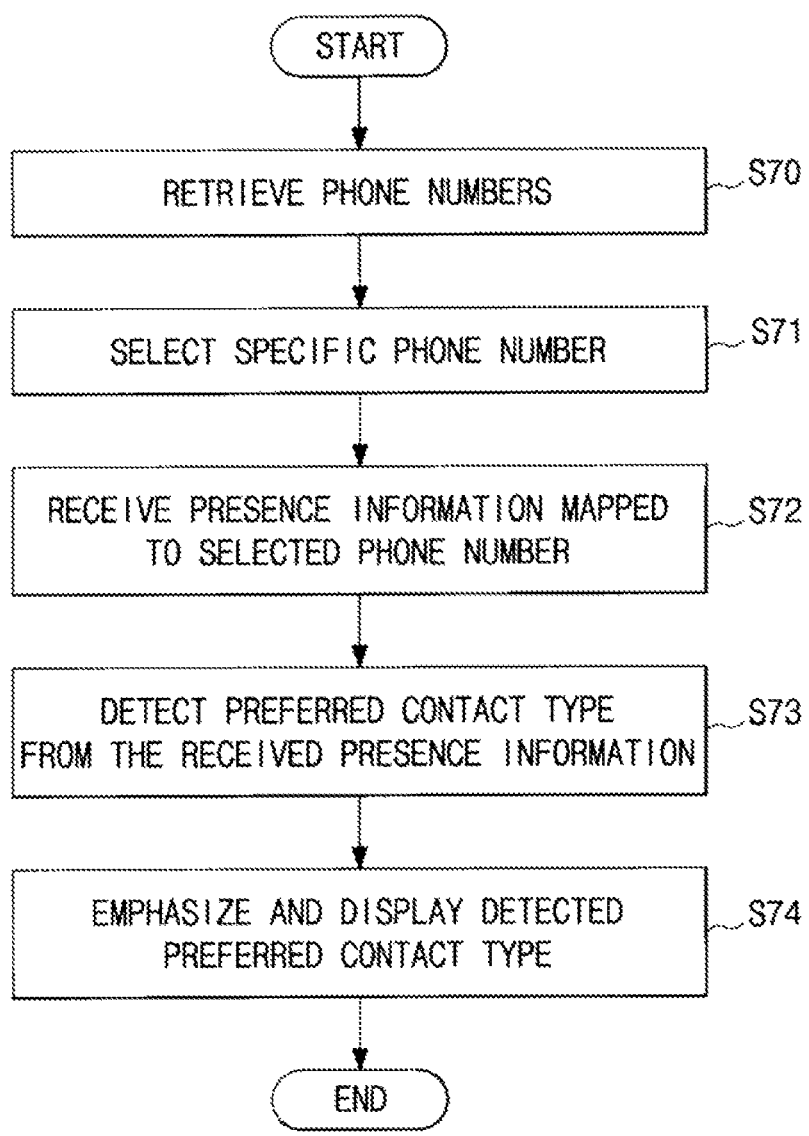
FIG. 7 is a flowchart illustrating a method for displaying a preferred contact type according to an exemplary embodiment of the present invention.

FIG. 7 is a flowchart illustrating a method for displaying a preferred contact type according to an exemplary embodiment of the present invention.

A terminal user retrieves stored phone numbers in step S70 and selects the specific phone number of the other party that the user desires to make contact with in step S71. When the specific phone number is selected in step S71, the controller 200 receives presence information of a terminal mapped to the selected phone number in step S72. With regard to step S72, because several exemplary methods in which the controller 200 may receive the presence information of the terminal mapped to the selected phone number have been explained above, they will not be restated here for conciseness. Since the presence information contains preferred contact information set by the other party, a preferred contact type is detected in step S73 and the detected preferred contact type is emphasized and displayed in step S74 when the controller 200 displays a menu including a type of contact with the other party. A method for emphasizing and displaying the preferred contact type has been described with reference to FIG. 5.

Figure 8:
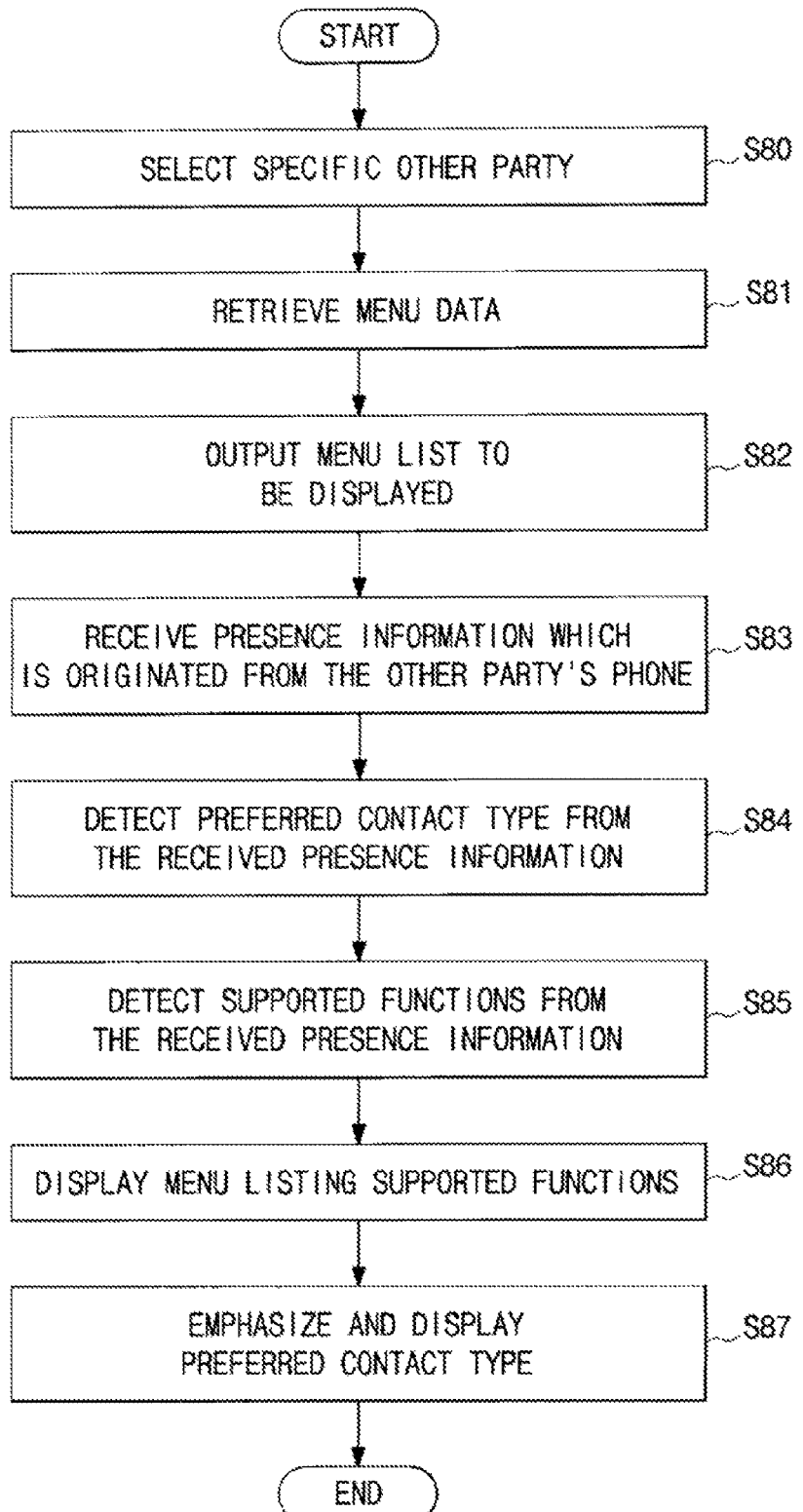
FIG. 8 is a flowchart illustrating a menu display method according to an exemplary embodiment of the present invention.

FIG. 8 is a flowchart illustrating a menu display method according to an exemplary embodiment of the present invention.

A terminal user retrieves a phone number list stored in his or her terminal and selects a specific other party in step S80. When the user presses the menu button, menu information to be displayed on the user terminal is retrieved from the menu data storage 232 in step S81. The retrieved menu information is delivered from the menu data storage 232 to the menu list receiver 202 in step S82.

After a basic menu list to be displayed on the user terminal is detected in steps S80~S82, the controller 200 receives the presence information of the other party's terminal mapped to the selected phone number in step S83 and stores the received presence information in the presence storage 234.

In step S84, the controller 200 detects a preferred contact type set by the other party from the presence information. In step S85, the controller 200 detects a function supported by the other party's terminal also from the presence information. The handset function detector 206 can detect the function supported by the other party's terminal by referring to the handset function table 236.

In step S86, the controller 200 controls to display a menu including functions that are supported by the other party's terminal as determined from the presence information. An example of displaying the menu of functions that are supported by the other party's terminal has been described with reference to FIG. 4. In step S87, the emphasized-item selector 204 emphasizes a specific item based on the detected preferred contact type and the supported function and displays the emphasized item on the display 220. An example of emphasizing and displaying the specific item has been described with reference to FIG. 5.

For example, when the functions supported by the other party's terminal detected from the presence information are Call, SMS, MMS, and E-mail and the preferred contact type is SMS, the emphasized-item selector 204 deactivates items of Video Communication and IM corresponding to functions unsupported by the other party's terminal and displays a corresponding menu. For example, an item of 'Compose SMS' is emphasized and displayed in bold letters in a large size.

When communication types of a phone call, video communication, short message service, multimedia message service, instant message service, and e-mail are displayed according to functions supported by the other party's terminal in a desired method, a terminal user can prevent communication with the other party from being performed in an unsupported communication type. Accordingly, an unnecessary cost and time to create and transmit a message related to a function unsupported by the other party's terminal can be prevented in advance.

A menu is displayed by reflecting a type of preferred contact set by the other party, such that a user can make contact with the other party in the preferred contact type and the convenience for the user can be improved by preventing communication from being performed in a type of contact undesired by the other party.

Of course, the specific terms and descriptions used herein are used merely to explain the concepts of the present invention and should not be construed as limiting the scope of the invention.

Although exemplary embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A mobile terminal comprising:
a touch screen configured to receive an input of a terminal user;
a transceiver configured to receive presence information including at least one communication type supported by a terminal of another party via a communication network;
a memory configured to store the received presence information and information of the other party; and
a controller configured to:
execute a phone number search function for transmitting a message to the other party,
retrieve, when the user searches for information on the other party using the phone number search function, the presence information mapped to the information of the other party from the memory,
detect the at least one communication type supported by the other party based on the retrieved presence information, and
determine a specific communication type to be displayed based on communication types of the mobile terminal and the detected at least one communication type of the terminal of the other party.

2. The mobile terminal of claim 1, wherein the communication types supported by the terminal of the other party comprise at least one of a phone call, a video communication, a short message service, a multimedia message service, an instant message service, and an e-mail.

3. The mobile terminal of claim 2, wherein the presence information further includes at least one of a device of the other party, a device status of the other party, a terminal availability of the other party and a user mood set by the other party.

4. The mobile terminal of claim 1, wherein the controller is configured to control a display to display a menu list including the specific communication type after determining the specific communication type to be displayed.

5. The mobile terminal of claim 4, wherein, when any one communication type of the communication types displayed on the menu list is selected by user of the mobile terminal, the controller is configured to execute the selected communication type.

6. The mobile terminal of claim 1, wherein, when the specific communication type to be displayed is only one, the controller is configured to execute the specific communication type.

7. The mobile terminal of claim 1, wherein the presence information is received:
when the terminal of the other party is selected by a user of the mobile terminal;
periodically when the terminal of the other party is registered in the mobile terminal; or
whenever the presence information of the other party's terminal registered in the mobile terminal is changed.

8. The mobile terminal of claim 1, wherein, when the presence information is received, the stored presence information is updated to the received presence information.

9. The mobile terminal of claim 1, wherein the controller comprises:

a menu list receiver configured to receive a menu list to be displayed on the mobile terminal;

a detector configured to detect the at least one communication type supported by the terminal of the other party; and an emphasized-item selector configured to emphasize and display the detected at least one communication type supported by the terminal of the other party.

10. The mobile terminal of claim 4, wherein displaying the menu list comprises displaying all communication types activated when all of the communication types supported by the mobile terminal are supported by the terminal of the other party.

11. The mobile terminal of claim 4, wherein the displaying of the menu list comprises displaying only communication types supported by the terminal of the other party.

12. The mobile terminal of claim 4, wherein the displaying of the menu list comprises displaying communication types unsupported by the terminal of the other party among communication types supported by the mobile terminal deactivated.

13. The mobile terminal of claim 4, wherein the displaying of the menu list comprises displaying a notification of an unsupported communication type when a user selects a communication type unsupported by the terminal of the other party among communication types displayed on the menu list.

14. A mobile terminal comprising:

a touch screen configured to receive an input of a terminal user;

a transceiver configured to receive presence information including at least one communication type supported by a terminal of another party via a communication network;

a memory configured to store the received presence information and information of the other party;

a display unit; and a controller configured to:

execute a phone number search function for transmitting a message to the other party, retrieve, when the user searches for information on the other party using the phone number search function, the presence information mapped to the information of the other party from the memory, extract the at least one communication type supported by the other party from the retrieved presence information, and display a specific communication type on the display unit based on communication types of the mobile terminal and the extracted at least one communication type of the terminal of the other party.

15. The mobile terminal of claim 14, wherein the communication types supported by the terminal of the other party comprise at least one of a phone call, a video communication, a short message service, a multimedia message service, an instant message service, and an e-mail.

16. The mobile terminal of claim 15, wherein the presence information further includes at least one of a device of the other party, a device status of the other party, a terminal availability of the other party and a user mood set by the other party.

17. The mobile terminal of claim 14, wherein the controller is configured to control a display to display a menu list including the specific communication type.

18. The mobile terminal of claim 17, wherein the controller is configured to execute a selected communication type when any one communication type of communication types displayed on the menu list is selected by user of the mobile terminal.

19. The mobile terminal of claim 14, wherein the controller is configured to execute a specific communication type when the specific communication type to be displayed is only one.

20. The mobile terminal of claim 14, wherein the presence information is received:

when the terminal of the other party is selected by a user of the mobile terminal;

periodically when the terminal of the other party is registered in the mobile terminal; or whenever the presence information of the other party's terminal registered in the mobile terminal is changed.

* * * * *